J. F. KITCHEN.
WIRE BENDING MACHINE.
APPLICATION FILED APR. 24, 1915.

1,293,119.

Patented Feb. 4, 1919.
7 SHEETS—SHEET 1.

WITNESSES

INVENTOR

J. F. KITCHEN.
WIRE BENDING MACHINE.
APPLICATION FILED APR. 24, 1915.

1,293,119.

Patented Feb. 4, 1919.
7 SHEETS—SHEET 2.

WITNESSES

INVENTOR
John F. Kitchen
By Fredk F. Winter
his attorney

J. F. KITCHEN.
WIRE BENDING MACHINE.
APPLICATION FILED APR. 24, 1915.

1,293,119.

Patented Feb. 4, 1919.
7 SHEETS—SHEET 4.

J. F. KITCHEN.
WIRE BENDING MACHINE.
APPLICATION FILED APR. 24, 1915.

1,293,119.

Patented Feb. 4, 1919.
7 SHEETS—SHEET 5.

WITNESSES

INVENTOR
John F. Kitchen
By Fredk W. Winter
his attorney

J. F. KITCHEN.
WIRE BENDING MACHINE.
APPLICATION FILED APR. 24, 1915.

1,293,119.

Patented Feb. 4, 1919.
7 SHEETS—SHEET 6.

WITNESSES

INVENTOR
John F. Kitchen
By Fredk N. Winter
his attorney

J. F. KITCHEN.
WIRE BENDING MACHINE.
APPLICATION FILED APR. 24, 1915.

1,293,119.

Patented Feb. 4, 1919.
7 SHEETS—SHEET 7.

WITNESSES

INVENTOR

UNITED STATES PATENT OFFICE.

JOHN F. KITCHEN, OF MEADVILLE, PENNSYLVANIA, ASSIGNOR TO THE SPIRELLA COMPANY, OF MEADVILLE, PENNSYLVANIA, A CORPORATION OF PENNSYLVANIA.

WIRE-BENDING MACHINE.

1,293,119.          Specification of Letters Patent.          Patented Feb. 4, 1919.

Application filed April 24, 1915. Serial No. 23,714.

*To all whom it may concern:*

Be it known that I, JOHN F. KITCHEN, a resident of Meadville, in the county of Crawford and State of Pennsylvania, have invented a new and useful Improvement in Wire-Bending Machines, of which the following is a specification.

This invention relates to apparatus for bending wire, and particularly for forming wire garment stays of the general form shown in the patent to James M. Welsh, 1,064,947, June 17, 1913, which stay consists of wire bent at intervals to form two series of alternately disposed loops or eyes lying along the edges of the stay and connected by two sets of diagonally extending crossing portions inclined in opposite directions.

The object of the invention is to provide an improved machine for fabricating this stay, which can be operated rapidly and therefore has a large output, which makes a very uniform stay, which can be adjusted to form stays of different sizes and made of different sizes of wire, in which the wire is bent by a winding member moving continuously in one direction in a circular path, so that recoil of the wire from the forming pins is largely avoided, which also imparts an initial twist or torsional set to the wire in fabricating the stay and therefore reinforces the stay as a whole, and which twist, when properly applied, gives it a greater ability to resist flatwise bending strains in one direction than in the other, and also a machine which may be made to produce a stay which is concavo-convex in cross section and thereby further increases its resistance to bending in one direction.

Further objects of the invention are in part obvious and in part will appear more in detail hereinafter.

The invention comprises the several features in a wire bending machine hereinafter described and claimed.

In the drawings, Fig. 1ª shows the stay feeding mechanism; Fig. 9 is a detail cross section on the line 9—9, Fig. 2, and showing the main operating shaft and the members thereon for operating various parts of the machine.

Referring first to Figs. 10 to 13 inclusive, 1 represents a master pin around which the wire is bent to form all of the loops or eyes of the stay, while 2 and 3 are supplemental pins for holding or supporting the already formed loops of the stay while coiling the wire around the master pin to form the next loop. The pins 1 and 2 are always on the same edge of the stay and in engagement with successive loops thereof, while the pin 3 is on the opposite edge of the stay and in engagement with the loop which lies midway between the two first-named loops. These three pins are movable in the direction of their length, but in no other direction, and are advanced and retracted to engage them with and disengage them from the stay at the proper times and in the proper sequence to enable the wire to be bent around the master pin to form a new loop and at the same time hold or support the wire fabric at all times during the winding of said loop.

The wire fabric as it is formed enters an opening in a tubular stay twisting or rotating member 4, which turns about a longitudinal axis through the center of the formed portion of the stay. The wire is bent around the master pin by a winding device 5 which terminates in a wire guiding member through which the wire is led to the master pin 1. This wire bending member travels in a circular path about the center of the pin 1 as an axis, and always moves in the same direction around said pin, as indicated by the arrows $x$.

Figure 10:
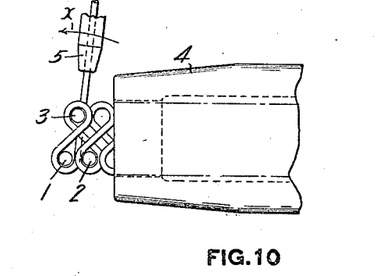
Figs. 10, 11, 12 and 13 are detail views, on a larger scale and partly diagrammatic, and illustrating the formation of a stay by this machine.
Figure 11:
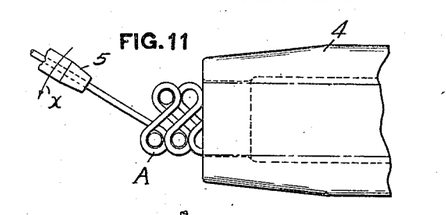
Figure 12:
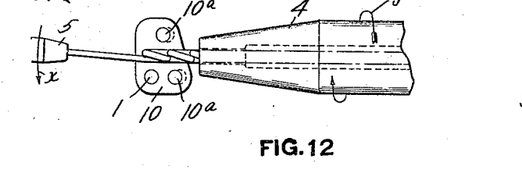
Figure 13:
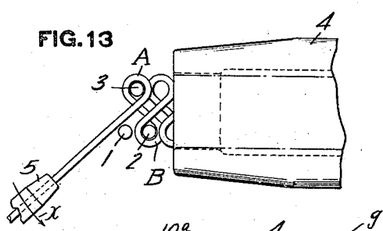
Figures 14, 16:
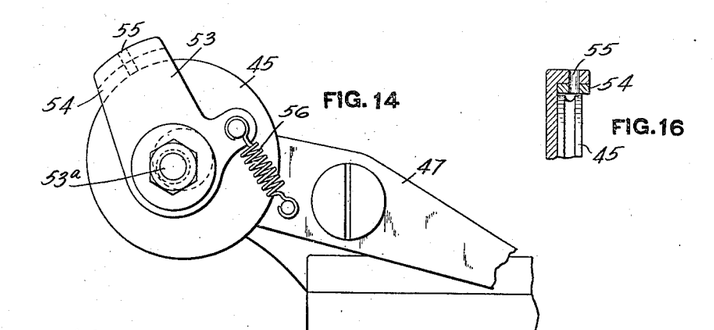
Figs. 14, 15 and 16 are detail views of the wire feeding mechanism.

In Fig. 10 a number of loops have already been formed and have entered the stay twisting tube 4. The pins 2 and 3 are engaged in two loops on opposite edges of the stay fabric. The wire bending member 5 is coiling or forming a new loop around the master pin 1. The unformed portion of the wire between the master pin and wire bending member has just passed the pin 2, which has reëntered its loop or eye of the stay fabric. Said wire is also just passing the pin 3, which at this moment is retracted from the stay fabric to allow the wire to pass. The wire bending member 5 is moving in a counter-clockwise direction, and when it reaches about the position shown in Fig. 11 has completely formed a new loop or eye A around the pin 1. At this point in the travel of the member 5 all of the pins 1, 2 and 3, are fully withdrawn from the stay and the stay-twisting tube 4 is rotated 180 degrees around its central longitudinal axis in the direction of arrow $g$, passing from the position shown in Fig. 11 through that in Fig. 12 to that in Fig. 13. During this movement, or just after it is completed, the stay fabric is fed longitudinally through the twisting tube 4 a distance equal to one half the distance between successive eyes or loops along the stay fabric, which leaves the newly formed loop or eye A directly opposite the end of the pin 3. The three pins 1, 2 and 3, now advance endwise into engagement with the stay fabric, pins 2 and 3 entering their respective eyes or loops B and A, and master pin 1 assuming the proper position for the winding of the new loop or eye thereon. By this time the bending member 5 has reached the position shown in Fig. 13 with the unformed portion of the wire about to engage the master pin 1. The bending member 5 continues in its circular path, traveling around the pin 1 and coiling a new loop thereon, as shown in Fig. 10, until it reaches the position shown in Fig. 11. As the wire passes the pins 2 and 3, said pins in turn are retracted endwise from engagement with the stay fabric to allow the wire to pass. When the stay reaches the position shown in Fig. 11 all of the pins are again retracted from the fabric and the twisting tube 4 is again rotated around its axis through an angle of 180 degrees. It may rotate in the same direction as it did the first time, but preferably rotates in the opposite direction, so that the motion of said twisting tube is an oscillating movement back and forth through angles of 180 degrees, the purpose of which will appear more fully hereinafter. The stay fabric is again fed forward half a step and the loop forming pins are reëngaged therewith, as before, and all operations proceed through the same cycle before described.

Each time the twisting tube 4 is rotated through an angle of 180 degrees it imparts a permanent torsional twist or set to the unformed portion of the wire lying between the already formed portion of the stay and the wire bending member 5. The wire is twisted around the master pin 1 in this twisted condition, so that the crossing portion of the stay connecting the newly-formed loop or eye to the preceding loop or eye of the formed stay fabric retains the twist imparted thereto. By rotating the twisting tube 4 alternately in both directions through angles of 180 degrees accumulation of twist in the wire is avoided and the twist imparted to and allowed to remain in successive crossing portions of the wire is in opposite directions. This permanent twist in the wire, as is well known, increases its ability to resist torsion in a direction which increases the twist therein, and by twisting the wire alternately in opposite directions all of the crossings have an increased ability to resist flatwise bending of the stay in the same direction. The net result is a stay which has a greater ability to resist flatwise bending strains which increase the twist in the crossings than it has to resist bending strains in the opposite direction.

Figures 1, 5:
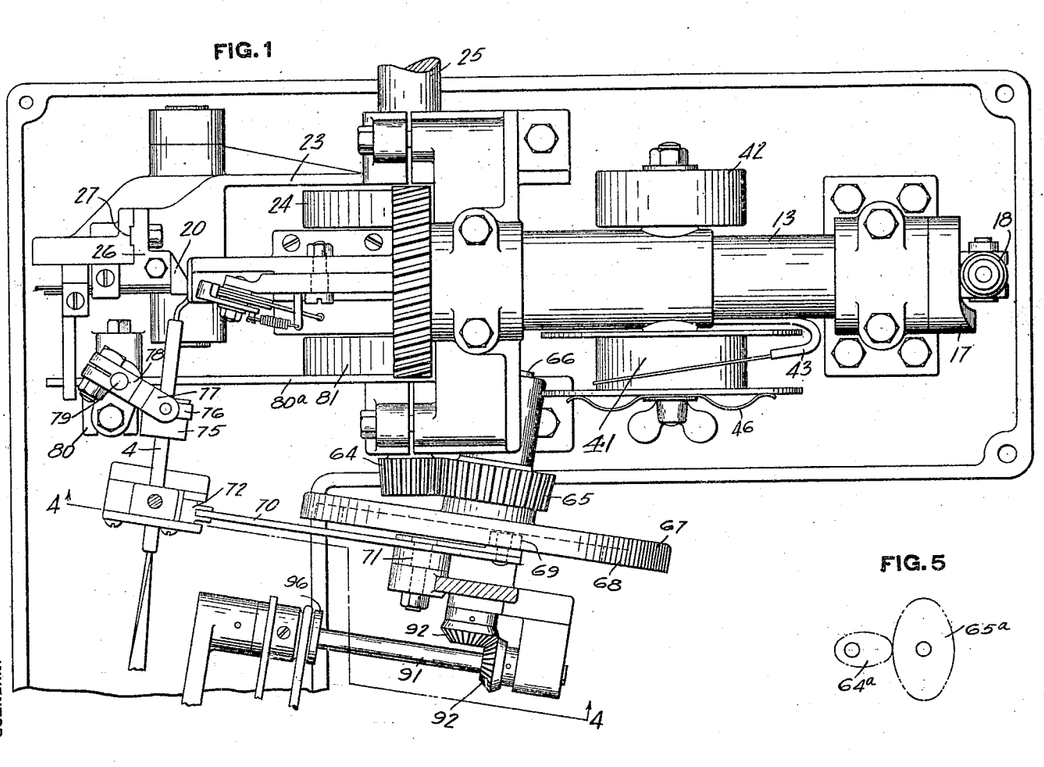
Figure 1 represents a plan view of one form of machine embodying the invention, the stay feeding devices being omitted.
Fig. 5 is a detail view, showing a modified arrangement of the gearing for operating the stay twisting device.
Figure 2:
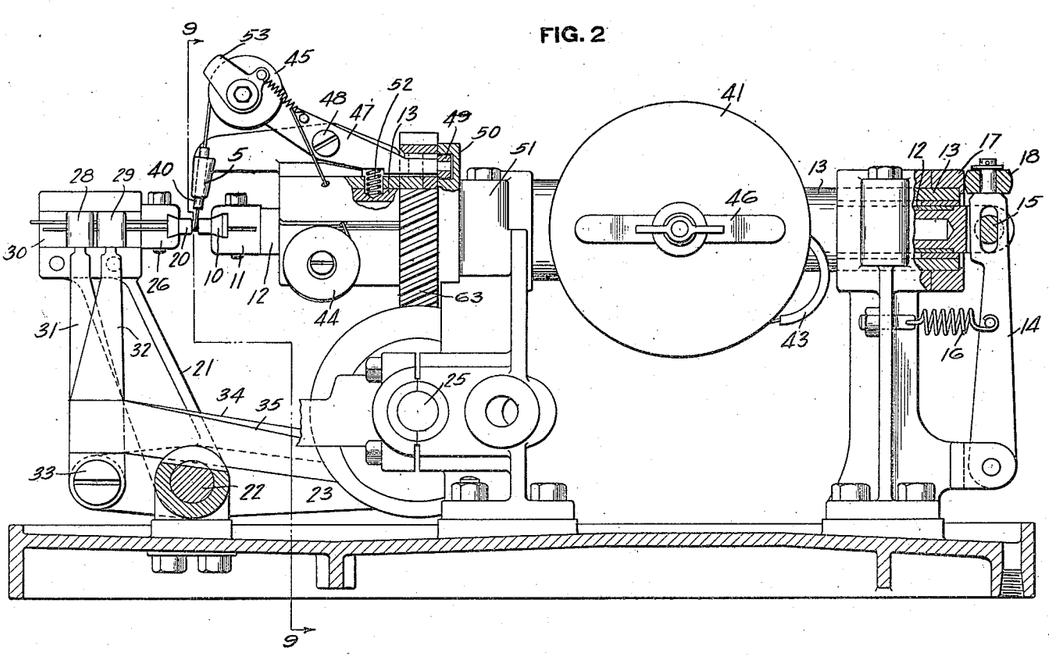
Fig. 2 is a side elevation of the machine shown in Fig. 1, parts being broken out and in section, and the stay twisting and feeding mechanism being omitted.

Referring now to Figs. 1 and 2, the master pin 1 is carried by a pin block 10, which is adjustable transversely to the axis of said pin in a slot or opening between the resilient jaws 11 on one end of a preferably hollow pin block plunger 12. This plunger is movable endwise within a hollow rotatable winding shaft 13, but has no rotative movement therein. It is reciprocated in said tube in any suitable manner, as by a lever 14 pivoted on the frame and having a slot to receive a cross pin 15 connected to the rear end of the pin-block plunger. Said lever is moved in one direction to advance the master pin into position for bending the wire therearound, by a spring 16, which yields in case there is any obstruction to the movement of the master pin, and therefore prevents injury to the machine, and in the opposite direction, to retract the pin, by a rotary cam 17 on the rear end of the hollow winder shaft 13, and which cam engages an antifriction member, such as the roller 18, on the upper end of the lever.

The pin block 10 coöperates with a pin block 20, both of said pin blocks having flat end faces which form between them a space in which the wire is wound around the master pin during the loop-forming operation. The pin blocks are moved away from each other to open up this space and enable the formed portion of the stay fabric to be rotated by the twisting tube between the coiling of successive eyes or loops. The longitudinal movement of pin block 10 has already been explained. Pin block 20 is carried by a positively operated lever 21, pivoted at 22 upon a convenient portion of the fixed frame, said lever having an arm or extension 23 whose inner end is provided with a roller (not shown) traveling in the groove of a cam 24 on the main transverse shaft 25. The contour of the cam is such that the pin block 20 is advanced and held inwardly near pin block 10 when the wire is being coiled, but is retracted from the pin block 10 when the stay fabric is rotated. Pin block 20, like pin block 10, is adjustable laterally in ways between the jaws of a clamping member 26, which in turn is adjustable in vertical ways 27 on the lever 21, so that the pin block 20 may be adjusted both horizontally and vertically.

The vertical adjustment of the pin block 20 is for the purpose of alining the pins 2 and 3, which project therefrom, with the master pin 1 carried by the coöperating pin block 10, it being essential to have the pins 1 and 2 in line with each other longitudinally of the stay. The horizontal or lateral adjustment of the pin blocks 10 and 20, and particularly of the pin block 20, is to enable the distance between pins 1 and 2 to be varied slightly to increase or diminish the pitch or the distance between adjacent loops along the edges of the stay.

The pins 2 and 3 are long pins which are supported behind the pin block 20 and extend through openings therein, and also, when said pins are advanced, into openings 10ᵃ in the pin block 10. These openings 10ᵃ may be elongated in the horizontal direction, as shown in dotted lines, Fig. 12, to permit the pin block 20 and pins 2 and 3 to be adjusted laterally for the purpose described. The master pin 1 on the pin block 10 may also extend into an opening in the pin block 20 when the pin blocks are advanced, and this opening may also be elongated for the same reason.

Figures 3, 6, 7, 8:
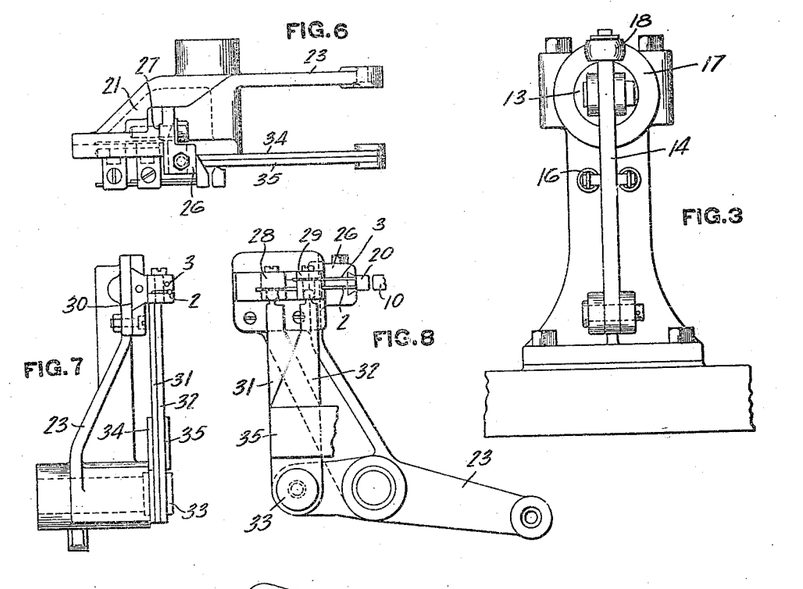
Fig. 3 is a detail elevation from the right in Fig. 2, and showing only the pin block plunger operating mechanism, the rest of the machine being omitted.
Figs. 6, 7 and 8 are detail views of the pins and pin blocks, and the levers for operating the same.

Each of the pins 2 and 3 is carried by a separate movable device, so that said pins may be moved endwise independently of each other and also of the pin block 20 through which they project. Pins 2 and 3 are clamped in the proper positions between the jaws of independent pin carriers 28 and 29, mounted one behind the other and both slidable in the same groove or way 30 in lever 21. Said carriers are operated independently by levers marked 31 and 32, each of which has a round head engaging an opening in the bottom of its carrier, said levers being pivoted at 33 upon the lever 21, and being provided with arms, marked 34 and 35 respectively, whose inner ends are provided with rollers engaging pin operating cams 36 and 37 on the main cam shaft 25. (See Figs. 6 and 9.)

The wire bending member 5, as shown in Fig. 2, is rigidly connected to the hollow winder shaft 13. It is provided with a hardened steel tubular member 40 from which the wire is led to the master pin, and whose inner end travels around the loop forming pins in a plane normal or approximately so to said pins between the pin blocks 10 and 20. The wire is fed to the tubular guide 40 from a spool 41, detachably secured to one side of the winder shaft 13 and preferably counterbalanced on the opposite side of said shaft by a suitable counterweight 42 to prevent vibration. From spool 41 the wire passes to and through a tube 43, thence along the winder shaft through a slot or tube therein, to a guide pulley 44, a second guide pulley 45, and then to the tube 40. All of the parts for guiding the wire from the spool to the bending tube 40 are arranged so that they conform to the inherent curve in the wire as it is wound on the spool, so that it always issues from the wire guide or tube with the curve in the wire lying in the same direction. This gives a much more uniform result than where the inherent curve in the wire is not taken care of. The wire spool is, of course, retarded from turning too easily by suitable springs 46, which prevent unwinding and tangling of the wire.

Figure 15:
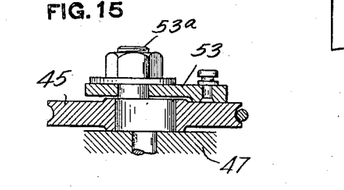
Figure 17:
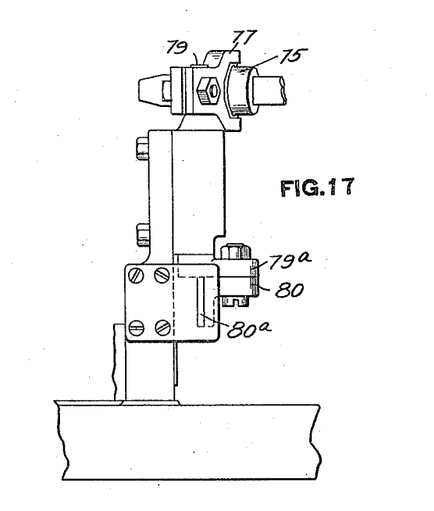
Fig. 17 is a detail end view of the mechanism for retracting the stay twisting tube.
Figure 18:
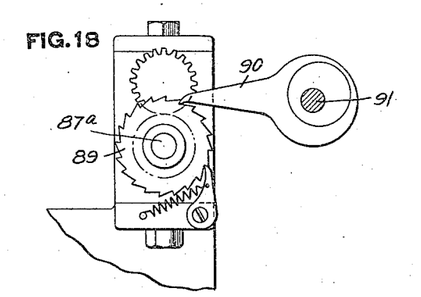
Fig. 18 is a detail section on the line 18—18, Fig. 1ª, of the mechanism for operating the stay feeding rolls.

The guide pulley 44 is rotatably mounted directly on the winder shaft 13 itself. The pulley 45, however, is rotatably mounted upon one end of a wire feeding lever 47 pivoted at 48 upon the winder shaft and having an antifriction member, such as a roller 49, traveling in a cam groove in a stationary cam 50 fixed to the support 51 in which the winding shaft is journaled. Said roller is always held against the outer wall of the cam groove by a pressure spring 52. The groove in the pulley 45 is a little shallower than the diameter of the wire, so that the wire projects slightly therefrom, as in Fig. 15, and the wire is prevented from moving backwardly over the guide pulley by a clamping device 53, which is pivotally mounted upon the lever 47 on stud 53ᵃ eccentric to the axis of the pulley 45. Said device extends outwardly to and over the periphery of the pulley and is provided with a shoe 54 lying over the peripheral groove therein. This shoe is preferably provided with a dowel fitting in an opening in the member 53, as at 55, so that it can be readily removed and replaced when desired. The shoe 54 is always held against the wire by a spring 56 connected at one end to the lever 47 and at its opposite end to the member 53. If the wire tends to slip backwardly through the guide 45 it forces the shoe 54 more tightly into engagement with the wire so that all backward movement with the wire is prevented.

The formed wire fabric is positively pulled through the wire twisting tube 4 by toothed feed rolls, more fully hereinafter described, so that there is always a tendency of the wire fabric to move into the twisting tube. When the pin blocks 10 and 20 are retracted and while the wire bending member is passing from the position shown in Fig. 11 to that shown in Fig. 13, the cam 50 tilts the rear end of the lever 47 outwardly and moves its outer end inwardly. The slack in the wire between the pulley 45 and wire bending pins is taken up by the feed rolls between which the stay passes, and the contour of the cam 50 is such that the swinging movement of the lever 47 permits the stay to be fed into the twisting tube a distance equal to half the distance between successive eyes or loops on the stay. When the wire is fed this amount the loop forming pins are reëngaged with the fabric and the cam 50 then moves the outer end of the lever 47 inwardly and swings the pulley 45 outwardly. The shoe 54 now yields and allows the pulley 45 to turn, so that wire is fed forward from the spool to replace the slack taken up by the feed of the stay.

The main shaft 25, at one end, is provided with the usual fast and loose driving pulleys 60, and preferably also with a hand wheel 61 for turning the machine over in starting or making adjustments thereof. Near its center said shaft is also provided with a spiral gear 62, meshing with a similar spiral gear 63 on the winder shaft 13, for constantly rotating the same in the same direction to bend the wire around the loop forming pins, as described. At its opposite end shaft 25 is provided with means for producing the oscillating movement of the formed wire fabric between the winding or coiling of successive loops or eyes. In the machine shown in Figs. 1 and 2, said shaft is provided with a gear 64 meshing with a larger gear 65 on a stub shaft 66 journaled in the frame, said stub shaft being connected to operate the twisting tube in any suitable manner. As shown, it is provided with a cam 67, in the track 68 of which travels a roller 69 on a lever 70 pivoted at 71 on the fixed frame, and whose opposite end is provided with a gear segment 72 meshing with a pinion 73 on the twisting tube. The cam track 68 has two annular dwell portions 74 and 75 for holding the twisting tube in its two positions during winding or coiling of loops on opposite edges of the stay, and also has two inclined portions 76 for rotating the twisting tube to turn the stay from one position to the other. The twisting tube preferably lies at an angle to a plane normal to the loop forming pins, as shown in Fig. 1, so that the gears 64 and 65 are slightly beveled. Also, to avoid a short and abrupt curve 76 in the transfer portion of the cam groove 68, these two pinions may be elliptical, as shown at $64^a$ and $65^a$, Fig. 5, which gives alternately rapid and slow movements of the shaft 66 from a uniform movement of the shaft 25.

Figure 4:
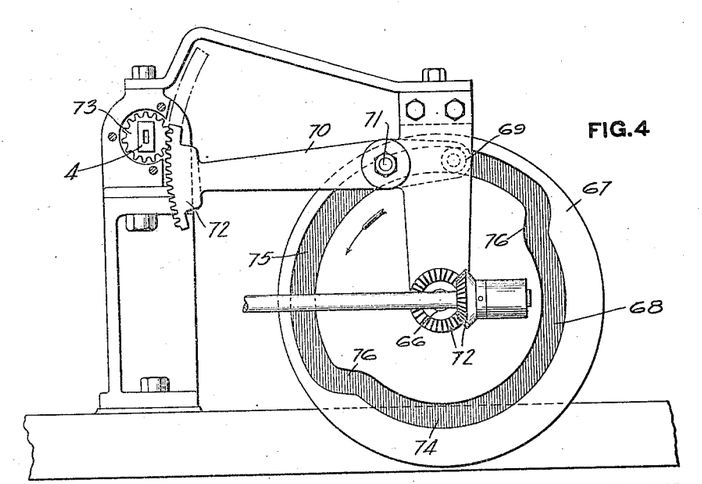
Fig. 4 is a sectional elevation of the stay twisting mechanism, on the line 4—4, Fig. 1, the rest of the machine being omitted.

The levers 21, 34 and 35, and the other parts of the mechanism are so arranged as to provide a space underneath the winder shaft 13 through which the wire feeding mechanism can pass. Means must also be provided for moving the twisting tube out of the way when the winder passes it, and any suitable arrangement can be employed for this purpose. As shown in Fig. 4, the twisting tube 4 is non-circular where it passes through the gear 73, so that it rotates with said gear and also can move longitudinally therein. It is also provided with a fixed sleeve 75 having an outer annular groove in which is a ring 76 provided with pins engaging a yoke 77 on one end of an arm 78 adjustably mounted upon an oscillating vertical shaft 79. Said shaft at its lower end has a second arm $79^a$ engaged by a yoke 80 on a sliding rod $80^a$ having a roller operated by a groove in the side of cam 81 on the main shaft 25. Just before the winding member 5 reaches the twister tube 4 rod $80^a$ is operated to slide the twisting tube back through the gear 73, so that its end portion is out of the way of the winding device, and is then operated to return the tube to initial position when the winder has passed. The particular arrangement for retracting the twisting tube is not, however, essential and many other suitable constructions may be substituted therefor, as will be readily apparent.

Figures 1A, 9:
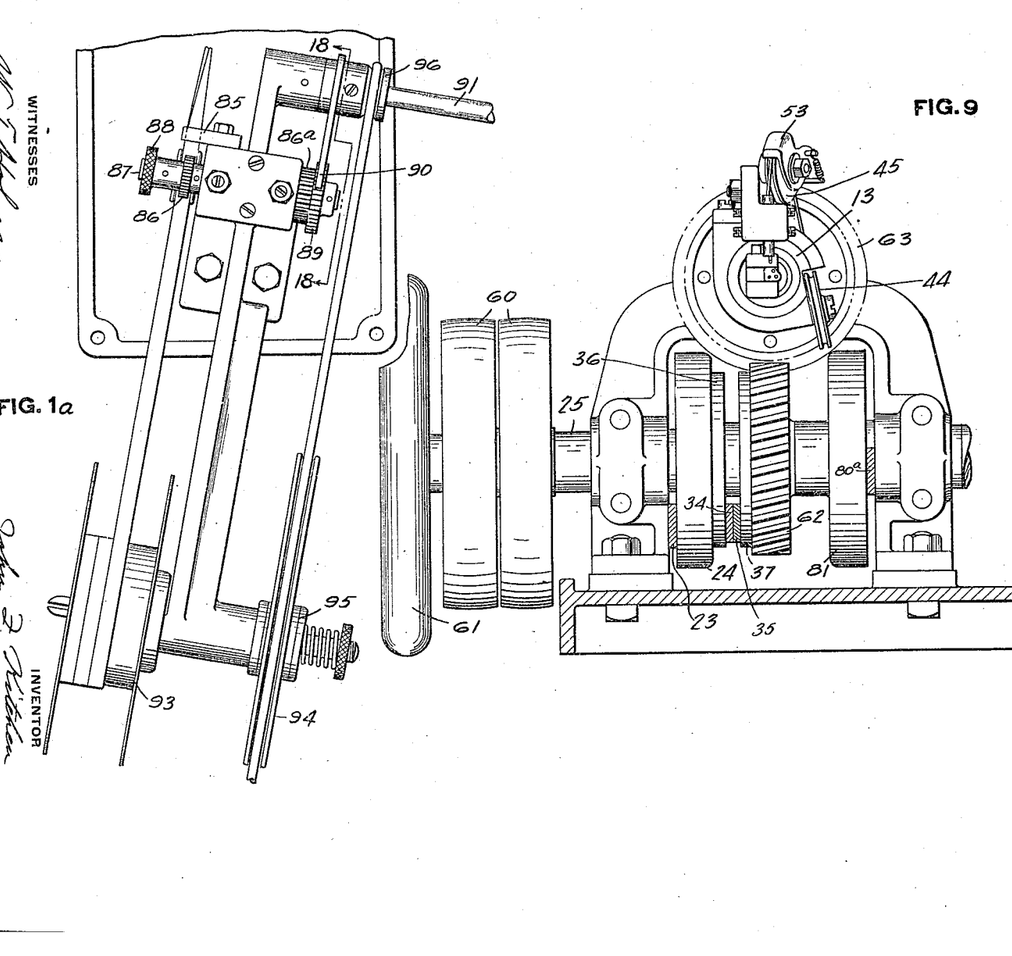

The formed stay issuing from the twisting tube 4 is led through a hollow guide 85, Fig. $1^a$, to a pair of toothed feeding rollers 86, connected by gears $86^a$, one of which rollers is mounted on and rotates with a shaft 87 provided with a hand nut or wheel 88 for adjusting the tension on the fabric between said rollers and the pin blocks. The shaft $87^a$ of the other roller, is provided with a ratchet wheel 89 operated by a pawl 90 eccentrically mounted upon a shaft 91 connected by bevel gears 92 to the shaft 66. From the feeding rollers 86 the stay is led to a reel 93 which is frictionally driven in any suitable manner, such as by a pulley 94 connected by a suitable friction or slip joint 95 to the reel carrying shaft, said pulley being driven by a belt passing over the pulley 96 on shaft 91.

It will, of course, be understood that the invention is not limited to the particular construction and arrangement of machine hereinbefore described and claimed, but is capable of considerable modification within the scope of the appended claims without departing from the spirit of the invention.

Figure 19:
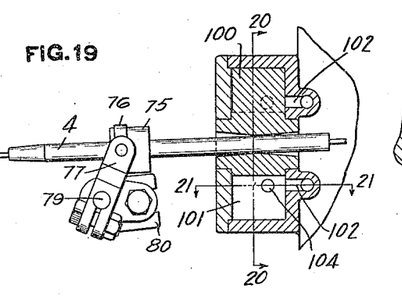
Fig. 19 is a plan view, partly in horizontal section, and showing modified apparatus for rotating the stay twisting tube.
Figure 20:
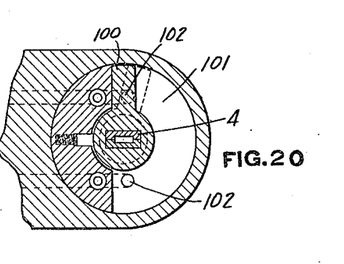
Fig. 20 is a cross section on the line 20—20, Fig. 19.
Figure 21:
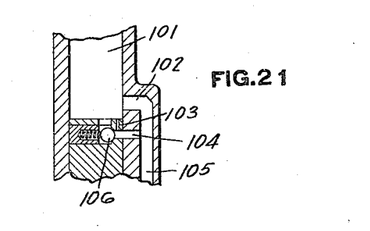
Fig. 21 is a detail section on the line 21—21, Fig. 19.
Figure 22:
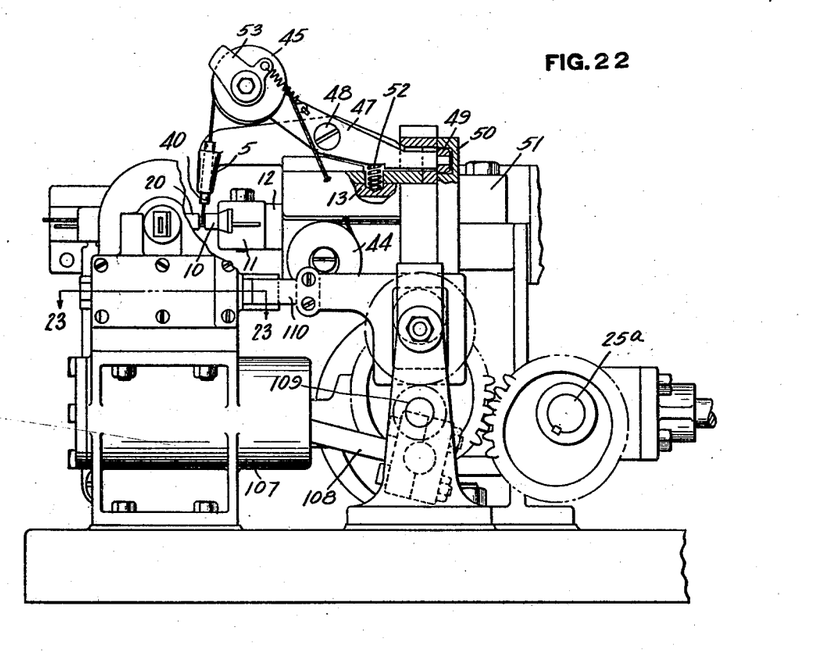
Fig. 22 is an elevation, showing a portion of a machine embodying the features illustrated in Figs. 19 to 21.
Figure 23:
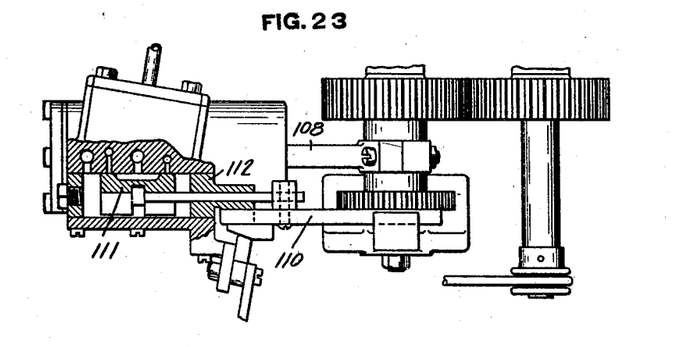
Fig. 23 is a plan view of the same machine, partly in horizontal section on the line 23—23, Fig. 22.
Figure 24:
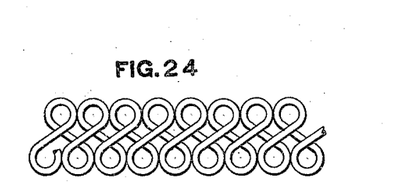
Figs. 24 and 25 are respectively plan and end views of a stay made according to this invention.

For example, Figs. 19 to 23 inclusive illustrate a modified arrangement for oscillating the stay twisting tube, which is quieter, more durable, and more rapid than the construction before described. In this arrangement the stay twisting tube 4 is substantially rectangular in cross section, and passes through a similarly shaped opening in an oscillating vane 100, the opening in said vane being belled out toward both ends, as shown in Fig. 19, to allow angular play of the twisting tube when it is swung back by the rocking device to clear the passing winding member. The vane 100 works in a pressure chamber 101, being moved alternately in an oscillating path from end to end of said chamber by admitting air pressure thereto. The ports at opposite ends of said chamber are similar, so that only one set thereof will be described.

Pressure is alternately admitted to and exhausted from opposite ends of the chamber 101 through main ports 102, located in the side walls of the casing a short distance from the ends of said chamber and connected by passage 105 to a source of pressure. As the vane 100 approaches each end of the chamber it covers the main port 102, which is then acting as an exhaust port. To allow the piston to reach the end of its stroke each end wall of the chamber is provided with a small leak port 103 communicating with a passage 104 connected to the passage 105 leading to the main port 102. The small leak port 103 slows up the piston at the end of its travel and allows it to reach the end wall of the chamber without knock or jar. To start the piston or vane on its return movement pressure is admitted to the passage 105 from which it enters the piston chamber through leak port 103 and also through the passage 104 which opens into the end of the chamber and in which is located a check valve 106 seating away from the chamber, so the pressure will not flow out through said passage when the piston approaches the same, but can flow in to start the piston and move it beyond the main port 102.

Pressure for operating the stay twisting vane 100 is supplied by a cylinder 107 in which is a piston operated by a connecting rod 108 connected to a crank shaft 109, which may be the main shaft of the machine, but is shown as a separate shaft connected to and operated by the main shaft 25ª. Shaft 109 also is geared to an eccentric for operating a valve controlling rod 110, the valve 111 connected to which is located in a chest 112 and alternately admits pressure to each of the passages 105 and opens them to exhaust, in the usual manner. The valve is so timed as to quickly operate the stay twisting device as soon as the pin blocks and pins are retracted far enough to permit the stay to be rotated.

Figure 25:
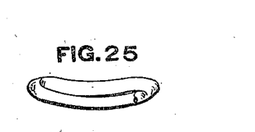

In all machines described the feeding of the wire and the winding movements are exactly the same for successive loops on both edges of the stay, but on account of the inherent twist in the wire between the last guide wheel 45 on the wire feed lever and the pin blocks, caused by twisting or rotating the stay alternately in opposite directions, (and also the inherent curve in the wire due to the reel on which it is wound, and which curve is always in the same direction, due to the arrangement of the wire feeding members), the stay comes through the machine with a noticeable plano-convex or concavo-convex form in cross section, as shown in Fig. 25. This effect can be increased or diminished by making the distance between the guide wheel and pin blocks shorter or longer, and by slight adjustments of various parts may be omitted entirely so that the stay is symmetrical and has no concavity whatever.

What I claim is:—

1. Apparatus for forming wire garment stays, comprising means for bending wire in one direction to form two series of oppositely disposed edge loops or eyes, and means for periodically turning the stay body about its longitudinal axis.

2. Apparatus for forming wire garment stays, comprising means for winding wire in one direction to form a loop or eye on one edge of the stay, means for turning the stay body about its longitudinal axis, and means for winding the wire in the same direction to form a loop or eye on the other edge of the stay.

3. Apparatus for forming wire garment stays, comprising means for winding wire in one direction in the plane of the stay to form two series of loops or eyes lying along the edge of the stay, and means for rotating the stay body alternately in opposite directions about its longitudinal axis to impart a twist to the wire.

4. Apparatus for forming wire garment stays, comprising means for bending wire to form a series of oppositely disposed loops or eyes connected by transverse portions or crossings, and means for rotating the stay body alternately in opposite directions around its longitudinal axis to impart a torsional set to the crossing portions of the wire.

5. Wire bending apparatus, comprising a loop-forming pin, means for winding the wire around said pin to form the loops or eyes, and means for rotating the formed wire around a longitudinal axis.

6. Wire bending apparatus, comprising a loop-forming pin, means for winding the wire around said pin continuously in the same direction to form the loops or eyes, and means for rotating the formed wire around a longitudinal axis to twist the wire.

7. Apparatus for bending wire, comprising a loop-forming pin, means for winding the wire around said pin to form loops or eyes, and means for rotating the formed wire alternately in opposite directions around a longitudinal axis.

8. Wire bending apparatus, comprising a loop-forming pin, means for advancing and retracting said pin, means for winding the wire around said pin, and means for rotating said formed wire when the pin is retracted.

9. Wire bending apparatus, comprising a loop-forming pin, means for advancing and retracting said pin, means for winding the wire around said pin, and means for rotating the formed wire alternately in opposite directions around a longitudinal axis when the pin is retracted.

10. Wire bending apparatus, comprising a loop-forming pin, means for advancing and retracting said pin, means for bending the wire continuously in the same direction around said pin, and means for rotating the formed wire around a longitudinal axis when the pin is retracted.

11. Wire bending apparatus, comprising a loop-forming pin, means for advancing and retracting said pin, means for winding the wire continuously in one direction around said pin to form loops or eyes, and means for rotating the formed wire alternately in opposite directions around a longitudinal axis when the pin is retracted.

12. Wire bending apparatus, comprising a master pin, means for winding the wire around said pin to form loops or eyes, means for longitudinally advancing and retracting said master pin, loop-holding pins, and means independent of the means for advancing the master pin for advancing and retracting said holding pins.

13. Wire bending apparatus, comprising a master pin, means for longitudinally advancing and retracting said pin, means for winding the wire around said pin to form the loops or eyes, loop holding pins, means for advancing and retracting said pins, and means for successively retracting said pins as the wire passes the same.

14. Wire bending apparatus, comprising a master pin, means for longitudinally advancing and retracting said pin, means for winding the wire continuously in the same direction around said pin to form loops or eyes, loop holding pins, means for retracting said pins as the wire passes the same, and means for rotating the stay body.

15. Wire bending apparatus, comprising a master pin, means for longitudinally advancing and retracting said pin, means for winding the wire continuously in the same direction around said pin to form loops or eyes, loop holding pins, means for retracting said pins as the wire passes the same, and means for rotating the stay body alternately in opposite directions around a longitudinal axis.

16. Wire bending apparatus, comprising a master pin, means for winding the wire around said pin to form loops or eyes, loop-holding pins, means for rotating the formed wire, and means for relatively moving the master pin and holding pins to enable the formed wire to be rotated therebetween.

17. Wire bending apparatus, comprising a master pin, means for bending the wire around said pin, loop-holding pins, means for advancing and retracting said pins, and means for adjusting said pins longitudinally of the stay body.

18. Wire bending apparatus, comprising loop-forming and holding pins, means for winding the wire around said pins, and a stay turning device.

19. Wire bending apparatus, comprising loop-forming and holding pins, means for winding the wire around said pins, a stay turning device, and means for retracting the turning device.

20. Wire bending apparatus, comprising loop-forming and holding pins, means rotatable around said pins for winding the wire thereon, and means at one side of said pins for turning the formed wire.

21. Wire bending apparatus, comprising loop-forming and holding pins, means rotatable around said pins for winding the wire thereon, means at one side of said pins for turning the formed wire, and means for retracting said turning device.

22. Wire bending apparatus, comprising a loop-forming pin, means for winding the wire around said pin to form the loops or eyes, means for rotating the formed wire around a longitudinal axis, and means for feeding the stay through the machine.

23. Wire bending apparatus, comprising a loop-forming pin, means for winding the wire around said pin continuously in the same direction to form the loops or eyes, means for rotating the formed wire around a longitudinal axis to twist the wire, and means for feeding the formed wire through the machine.

24. Apparatus for bending wire, comprising a loop-forming pin, means for winding the wire around said pin to form loops or eyes, means for rotating the formed wire alternately in opposite directions around a longitudinal axis, and means for feeding the formed wire through the machine.

25. Wire bending apparatus, comprising a loop-forming pin, means for advancing and retracting said pin, means for winding the wire around said pin, means for rotating said formed wire when the pin is retracted, and means for feeding the formed wire through the machine.

26. Wire bending apparatus, comprising a loop-forming pin, means for advancing and retracting said pin, means for winding the wire around said pin, means for rotating the formed wire alternately in opposite directions around a longitudinal axis when the pin is retracted, and means for feeding the formed wire through the machine.

27. Wire bending apparatus, comprising a loop-forming pin, means for advancing and retracting said pin, means for bending the wire continuously in the same direction around said pin, means for rotating the formed wire around a longitudinal axis when the pin is retracted, and means for feeding the formed wire through the machine.

28. Wire bending apparatus, comprising loop-forming and holding pins, means revoluble around said pins for winding the wire thereon, and means for advancing and retracting said pins in order and together.

29. Wire bending apparatus, comprising a rotatable hollow member carrying a wire winding device, a reciprocating shaft therein, and a master pin on said shaft around which the wire is wound.

30. Wire bending apparatus, comprising a rotatable hollow member carrying a wire winding device, a reciprocating shaft therein, a master pin on said shaft around which the wire is wound, and loop-holding pins coöperating with said master pin.

31. Wire bending apparatus, comprising a rotatable hollow member carrying a wire winding device, a reciprocating shaft therein, a master pin on said shaft around which the wire is wound, loop-holding pins coöperating with said master pin, and means for advancing and retracting said holding pins.

32. Wire bending apparatus, comprising a rotatable hollow member carrying a wire winding device, a reciprocating shaft therein, a master pin on said shaft around which the wire is wound, loop-holding pins coöperating with said master pin, means for advancing and retracting said holding pins, and means for rotating the stay body.

In testimony whereof I have hereunto set my hand.

JOHN F. KITCHEN.

Witnesses:
T. F. CHARLTON,
M. M. HEIL.

Copies of this patent may be obtained for five cents each, by addressing the "Commissioner of Patents, Washington, D. C."